Oct. 9, 1928.

T. MIDGLEY

METHOD OF MAKING CLINCHER TIRES

Filed Feb. 19, 1926   2 Sheets-Sheet 1

1,687,301

INVENTOR.
Thomas Midgley
BY
Edward T. Taylor
ATTORNEY.

Oct. 9, 1928.                                                                 1,687,301
T. MIDGLEY
METHOD OF MAKING CLINCHER TIRES
Filed Feb. 19, 1926          2 Sheets-Sheet 2
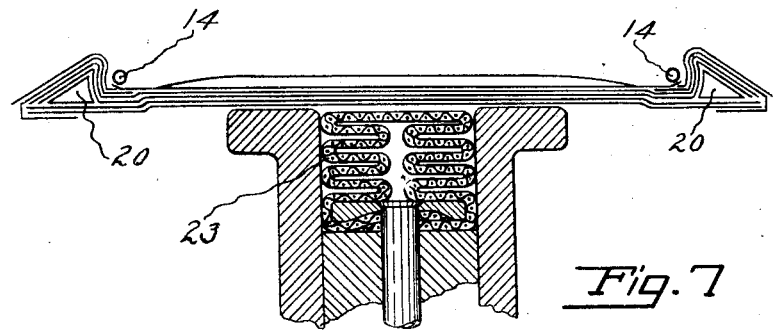
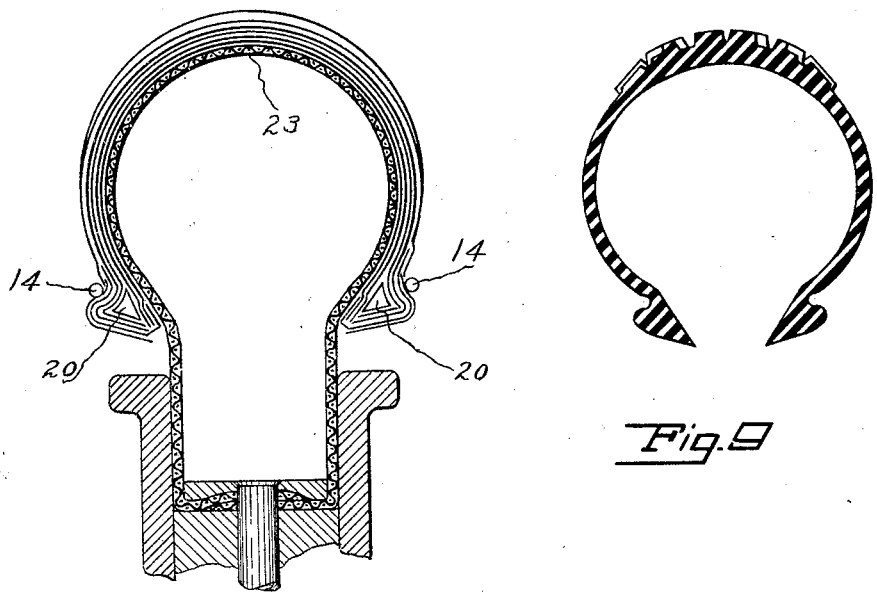
INVENTOR.
Thomas Midgley
BY
Edward C. Taylor
ATTORNEY.

Patented Oct. 9, 1928.

1,687,301

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MAKING CLINCHER TIRES.

Application filed February 19, 1926. Serial No. 89,477.

This invention relates to the manufacture of clincher tires by the flat band method, that is, where the tire is first constructed in flat form and is then expanded into tire shape prior to vulcanization. In prior methods of this general type there has been considerable difficulty experienced in getting accurate registration of the clincher beads and in getting accuracy in the dimensions of the tire. By my invention I am enabled to avoid these difficulties and also to keep accurate control of the stretchable bead fillers at all times, maintaining them in perfect alignment and avoiding wastage due to crushing of the beads in vulcanization. In general it may be said that my improved method consists in building the flat band clincher tire with inextensible anchorages located in the clinch of the beads but otherwise unattached to the tire, expanding the band to tire form with the inextensible anchorages still in place, and removing the inextensible anchorages from the bead only when the tire is in substantially its ultimate form.

The invention will now be described with reference to the accompanying drawings, in which—

Figs. 7 and 8 are sectional views illustrating one method of expanding the casing to tire form; and Fig. 9 is a sectional view of the completed tire.

I am aware that it has been proposed, as in British Patent 8,682 of 1911 and German Patent 249,583, to form a clincher tire with inextensible anchorages built into the body of the tire material and to cut off these inextensible anchorages after vulcanization. According to my invention, however, I avoid the waste of material which is necessarily present in these prior patents and at the same time increase the speed and facility of the building operation. The present method of building clincher tires follows in some respects the procedure outlined in my prior application Serial No. 49,696, filed August 12, 1925, and preferably utilizes mechanism such as is shown in my prior application Serial No. 83,209, filed Jan. 23, 1926.

Figure 1:
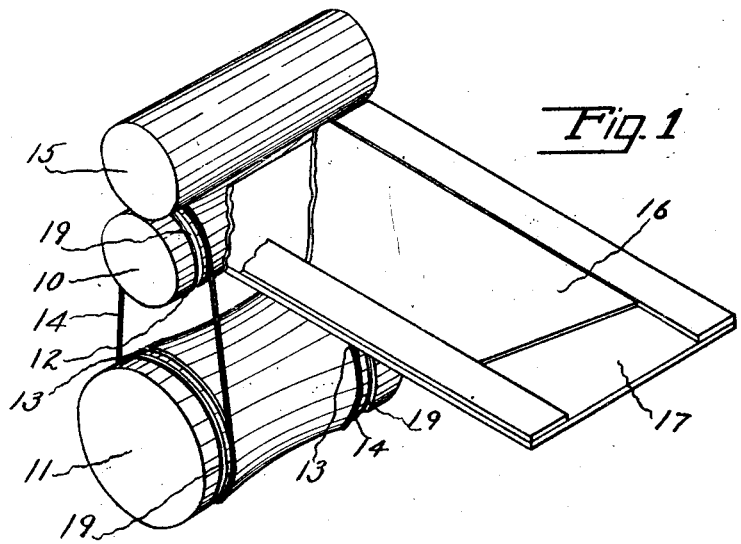
Fig. 1 is a diagrammatic perspective view showing diagrammatically one form of apparatus which may be used in building a tire in accordance with my invention.
Figure 2:
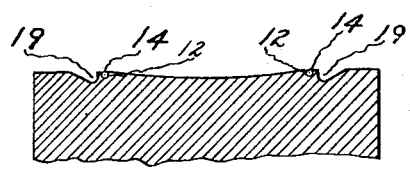
Fig. 2 is a detailed section of one of the rolls of said apparatus.
Figure 3:
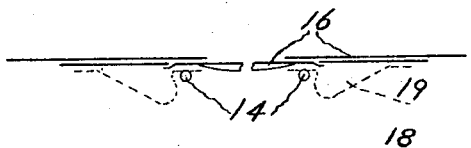
Fig. 3 is a diagrammatic view illustrating the first step in the building operation.

As far as the disclosure necessary for an understanding of the present method requires, the machine may be considered as having the elemental parts shown in Fig. 1. Rolls 10 and 11 are provided with pairs of grooves 12 and 13 respectively, in which inextensible anchorages 14 may be looped. Bearing against the surface of roll 10 is a third roll 15 which serves to press the superposed layers of rubberized tire building material into firm adherence. Various refinements of the apparatus may, of course, be made, but that shown in Fig. 1 in outline is sufficient as an illustration of one way in which the building method to be described can be practiced.

Figure 4:
Figs. 4, 5 and 6 are similar views showing later steps.
Figure 5:
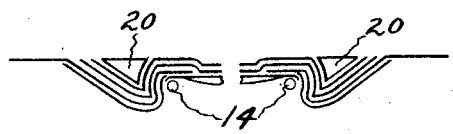
Figure 6:
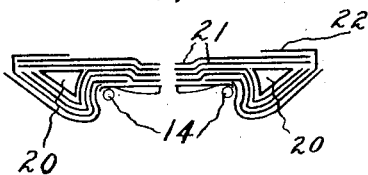

The first step in the building operation is to hold the inextensible anchorages 14 taut and spaced apart, as by locating them in the grooves 12 and 13. If it is desired to form the tire complete in flat band form with the covering rubber in place, this covering rubber is preferably built up in unit form as at 16 including the tread, sidewalls and chafing strips, and fed as over a guide 17 to the bight of rolls 10 and 15. By the action of these rolls the strip is caused to adhere to the inextensible anchorages and to form a complete annular band. The plies of fabric commonly known as the over-bead plies 18 are now applied in a similar manner as in Fig. 4. By means of a suitable stitching tool, or by the action of the beads themselves, these layers of fabric are now forced down into grooves 19 in the rollers and the extensible clincher bead fillers 20 are applied as in Fig. 5. The under-bead fabric layers may now be applied as at 21 (Fig. 6) and the lock-up around the bead completed by a folding of the chafing strip as at 22.

The annular flat band thus formed is then inverted, leaving the inextensible anchorages in place, and is placed on a suitable expanding device as, for example, the expansible bag 23 (Fig. 7). Upon the expansion of this bag, which is shown as being of the type shown in my prior application Serial No. 49,695, filed August 12, 1925, the tire will assume the usual horseshoe form desirable for a pneumatic tire casing. During the expansion the inextensible anchorages 14, which are located in the clinch of the tire over the beads, restrain the latter from any uneven stretch and preserve them in their true relationship. This is clearly shown in Fig. 8 of the drawings. After the tire has been expanded and is permanently held in its horseshoe form by a period of setting or by the insertion of an annular pressure bag, the bead anchorages 14 may be removed by simply working them off the clinch of the bead. This is an easy matter when the tire is not forced against the bead members by the outward pressure of the bag 22. The tire may now be vulcanized in the form shown in Fig. 9 with no danger of the clincher bead fillers becoming displaced.

Having thus described my invention, I claim:

1. A method of making clincher tires which comprises forming a flat carcass band, locating inextensible anchorages in the clinch of the beads, expanding the band to tire form, and removing the inextensible anchorages from the clinch of the beads.

2. A method of making clincher tires which comprises locating a pair of inextensible annular anchorages in spaced relation, building a tire carcass in substantially flat form face down on the anchorages while locating clincher beads in the carcass so as to bring the clinch of the beads over the anchorages, inverting the carcass band thus formed, expanding the inverted band to tire form, and removing the inextensible anchorages from the clinch of the beads.

3. A method of making clincher tires which comprises supporting a pair of inextensible anchorages in spaced relation, applying the over-bead plies of the tire to said anchorages, applying clincher bead fillers to this partial assembly so that the clinch portion of the bead fillers will lie over the inextensible anchorages, applying the under-bead plies, inverting the carcass band thus formed, expanding the inverted band to tire form, and removing the inextensible anchorages from the clinch of the beads.

THOMAS MIDGLEY.